Figure 1:
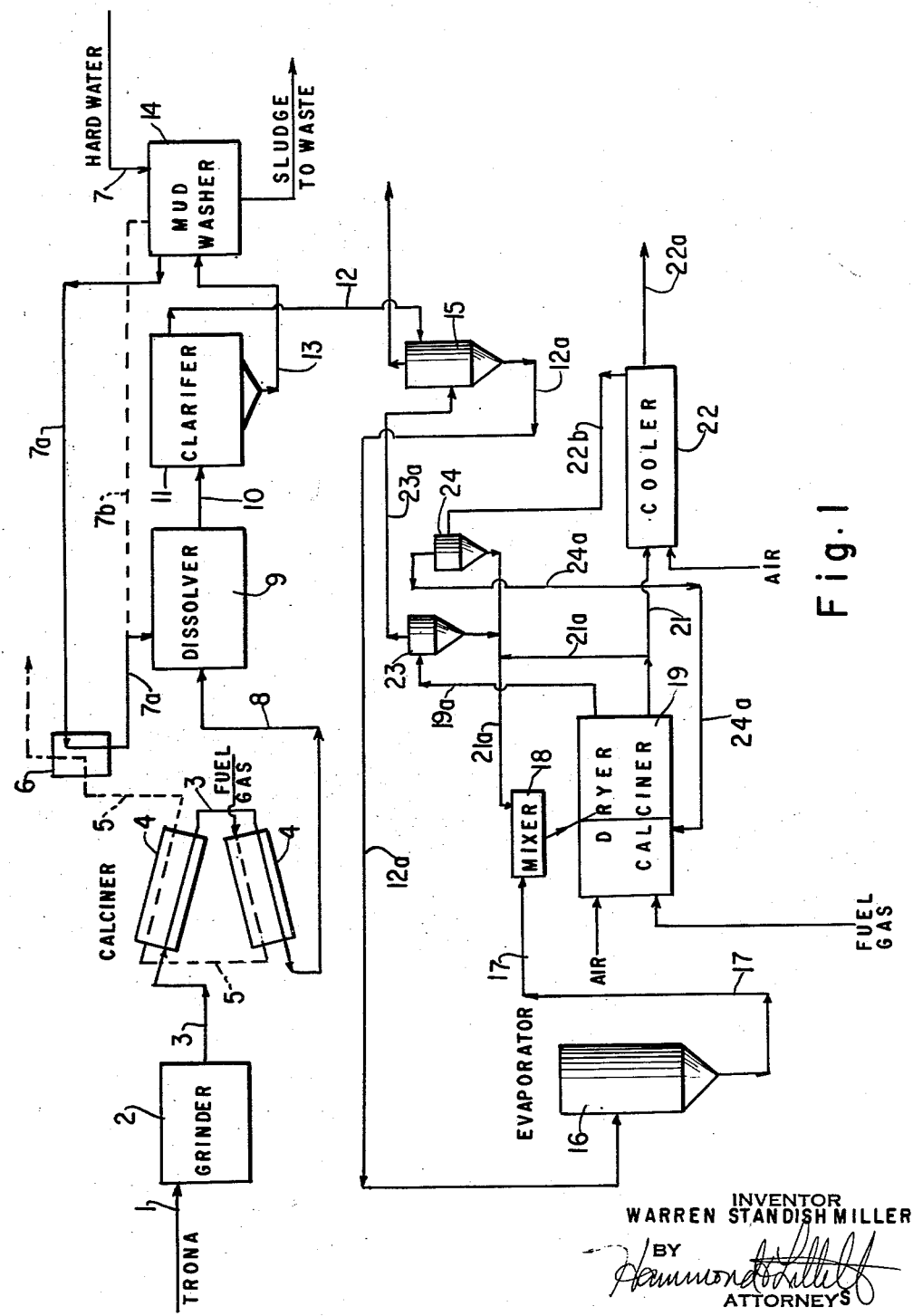

June 15, 1965 W. S. MILLER 3,189,408
METHOD OF PRODUCING SODA ASH FROM TRONA
Filed Sept. 25, 1961 2 Sheets-Sheet 2

INVENTOR
WARREN STANDISH MILLER
BY
Hammond & Littell
ATTORNEYS 3,189,408
METHOD OF PRODUCING SODA ASH FROM TRONA
Warren Standish Miller, Fullerton, Calif., assignor, by mesne assignments, to Intermountain Research & Development Corporation, Cheyenne, Wyo., a corporation of Wyoming
Filed Sept. 25, 1961, Ser. No. 140,583
15 Claims. (Cl. 23—63)

This invention relates to the production of soda ash from trona and more particularly to the production of soda ash from crude Wyoming trona.

Crude trona, for example, from the State of Wyoming, consists of about 94 to 96% of sodium sesquicarbonate ($NaCO_3 NaHCO_3 \cdot 2H_2O$) mixed with about 4 to 6% of insoluble impurities and contains small amounts of iron, sulfates, chlorides, etc. A typical analysis is $Na_2CO_3$ 45.11%, $NaHCO_3$ 35.75%, $H_2O$ 15.32%, $NaCl$ 0.03%, $Na_2SO_4$ 0.01%, $Fe_2O_3$ (total) 0.11%, insolubles 3.75%. This analysis will differ depending upon the location in the mine from which the trona is removed, some portions carrying larger or smaller percentages of insolubles and other impurities.

The normal process of producing soda ash from crude trona consists of dissolving crude trona or crude calcined trona in a recirculating mother liquor, separating the insoluble impurities therefrom, crystallizing sodium sesquicarbonate, sodium carbonate monohydrate or anhydrous sodium carbonate from the solution, separating the crystals from the mother liquor and calcining or drying the crystals to produce soda ash and returning the mother liquor to the dissolving or crystallizing step. Such processes are described in U.S. Patents No. 2,639,217, No. 2,770,524 and No. 2,962,348.

These processes have the defect that (1) large amounts of mother liquor must be constantly recirculated through the plant, (2) the mother liquor already carrying a high percentage of dissolved sodium sesquicarbonate or sodium carbonate does not have as high dissolving capacity as water, (3) where trona is dissolved the temperature of the dissolver solution must be maintained at about 95 to 98° C. with consequent necessity to insulate all liquor lines, dissolvers, settling tanks, etc., (4) impurities build up in the mother liquor and in the process of Patent No. 2,639,217, the mother liquor becomes too high in sodium carbonate so that substantial amounts of mother liquor must be discarded to keep the mother liquor in balance and/or prevent build up of impurities therein, and (5) expensive means, such as filters or centrifuges must be provided to separate the crystals from the mother liquor. For example, in a plant producing 300,000 tons of soda ash per year according to the process of Patent No. 2,639,217, about 3,500,000 gallons of mother liquor or impure trona solution per day must be constantly recirculated through the plant.

One of the objects of this invention is to provide a process of producing refined soda ash from crude trona in which the recirculation of mother liquor from a crystallizing step to a dissolving step is eliminated and relatively pure water is used in the dissolving step.

Another object of the invention is to provide a process for producing refined soda ash from crude trona in which the separation of sodium carbonate containing crystals from a mother liquor is avoided and the cost of expensive centrifuges, filters or the like for this step of the prior practice is eliminated or substantially reduced.

Another object of this invention is to provide a process of producing refined soda ash from crude trona in which crude trona or calcined crude trona is dissolved in relatively pure water, the insolubles separated from the solution and the solution evaporated to precipitate sodium carbonate containing crystals therein and the mother liquor and precipitated crystals are absorbed in a recirculated stream of hot calcined soda ash, whereby a portion of the recirculated soda ash is hydrated to sodium carbonate monohydrate and the evaporator discharge stream containing the precipitated sodium carbonate crystals and mother liquor is dried sufficiently to be fed to a dryer-calciner wherein the sodium carbonate containing crystals are dried or calcined to soda ash.

Another object of this invention is to avoid build up of excessive normal carbonate and of soluble impurities in a recirculating mother liquor which according to prior practice must be discarded, with consequent loss of carbonate values, in order to keep the circulating mother liquor system in balance.

Another object of the invention is to provide a process which in the dissolving and clarifying steps, can be operated at lower temperatures.

Another object of the invention is to provide soda ash of improved particle size and particle density.

Various other objects and advantages of my invention will appear as this description proceeds.

As the process hereinafter described in greater detail can be operated to produce crystals of sodium carbonate monohydrate, sodium sesquicarbonate, mixtures of sodium sesquicarbonate and sodium bicarbonate, anhydrous sodium carbonate and other sodium carbonate containing crystals in the evaporation step to be later calcined or dried to produce soda ash, the term "sodium carbonate containing crystals" will be used in this specification and claims to designate any sodium carbonate containing crystals produced in the evaporation or precipitation step.

Referring now to the drawings which illustrate preferred methods of operation of the process of this invention, FIG. 1 a diagrammatic flow sheet illustrating an operation of my process to produce sodium carbonate monohydrate or anhydrous sodium carbonate from calcined crude trona in the evaporation or crystallization step.

Figure 2:
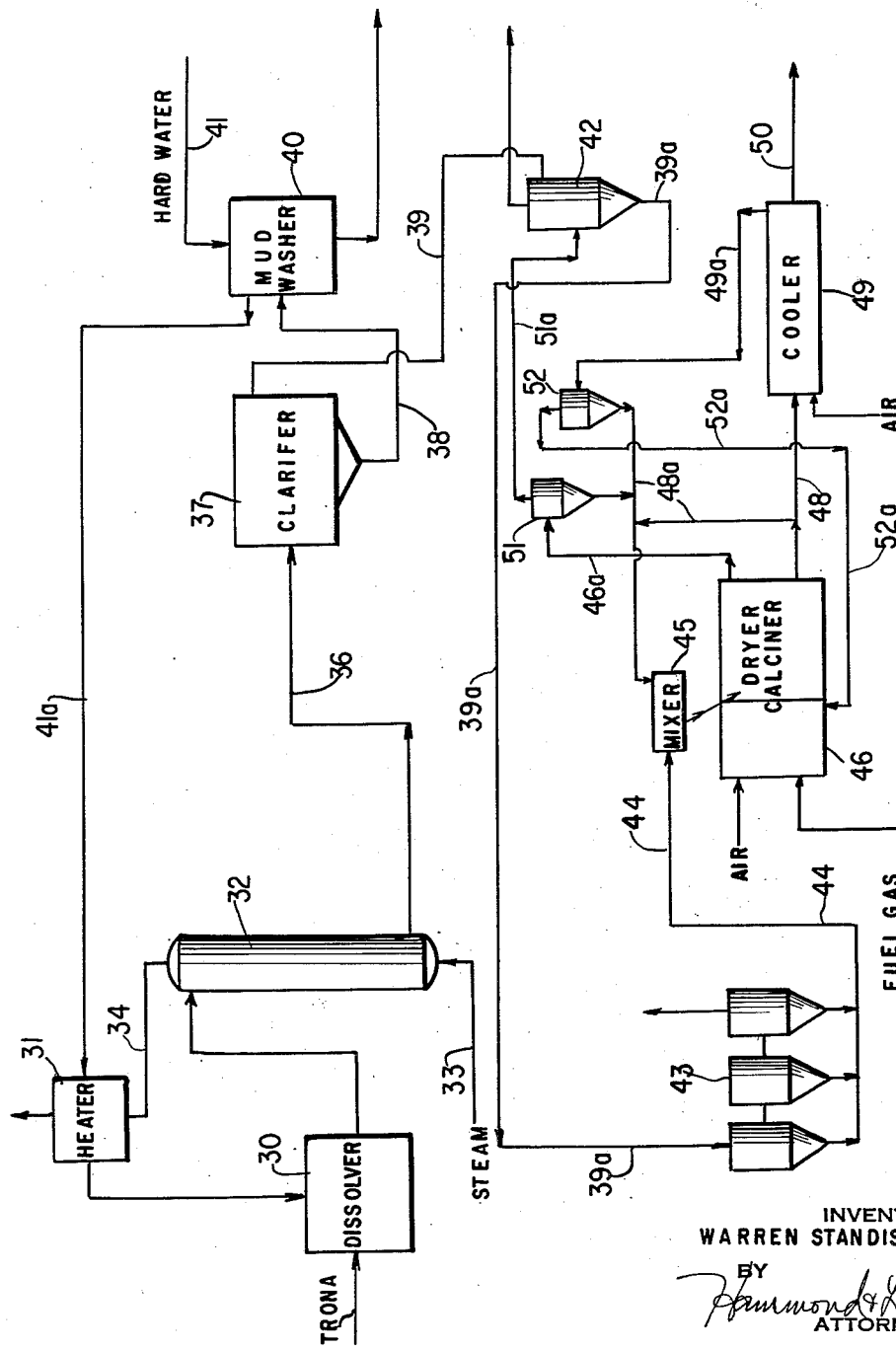

FIG. 2 is a diagrammatic flow sheet illustrating an operation of my process to produce sodium carbonate monohydrate or sodium sesquicarbonate or mixtures of sodium sesquicarbonate and sodium bicarbonate or mixtures of sodium sesquicarbonate and sodium carbonate monohydrate from uncalcined crude trona in the evaporation or crystallization step.

Numerous variations in the dissolving and crystallization steps can be made from the specific steps illustrated in these flow sheets, some of which will be pointed out as this description proceeds.

In the preferred embodiment of my invention illustrated in FIG. 1 dry mined crude trona as received from a mine or other source is passed by line 1 to a grinding station 2 where it is preferably ground to −10 mesh and passed by line 3 to a calciner station 4 where it is calcined preferably in a two stage gas fired concurrent flow calciner 4 to crude sodium carbonate. The exhaust gases from the calciner 4 flow through the line 5 to a wet scrubber 6 where the hot gases are contacted with water to wash out and recover the sodium carbonate values in the calciner gas stream and to heat the water to the desired temperature for dissolving the sodium carbonate in the main discharge stream 8 from the calciner 4.

The crude calcined sodium carbonate from the calciner 4 is passed at a temperature of about 160° C. through the line 8 to the dissolvers 9 where it is dissolved in water and the solution of sodium carbonate together with the insolubles flows through the line 10, at a temperature of about 60° C. to the clarifiers 11 where the insolubles settle and are discharged from the bottom of the clarifiers and the clear sodium carbonate solution overflows through the line 12. As it is only necessary to keep the process lines, dissolvers, clarifiers, etc., above 35° C. the process can be permitted to operate at its natural temperature levels and expensive insulation of the process lines, dissolver tanks, etc., can be reduced.

The insoluble muds are pumped through the line 13 to a mud washing station 14 where the residual carbonate values are washed out of the muds and the natural water of the region used for dissolving the sodium carbonate is softened. In the mud washing station 14 and makeup or feed water natural to the region, and having an average hardness of about 270 p.p.m., calculated as $CaCO_3$, is introduced through the line 7 and in contact with the sodium carbonate containing muds, is softened to about 56 p.p.m. $CaCO_3$, which is about the degree of softness obtained in a commercial lime soda water softening plant, and the insoluble muds, containing any $CaCO_3$ precipitated from the natural water are settled and discharged to waste and the now softened water overflows from the top of the mud washing settlers into the line 7a where it flows back through the scrubber 6 in direct contact with the exhaust gases from the calciners 4 to wash out the dust and dissolve the sodium carbonate values therein and then into the main dissolvers 9.

The natural waters of the trona region of Wyoming have an average hardness of about 270 p.p.m. calculated as $CaCO_3$ and if used without prior softening would quickly scale the evaporators and other heat exchange equipment. While the water from the local streams or rivers or from storage ponds around the plant may be softened in various ways, it is preferred to soften the water by bringing the natural unheated hard water of the region into the plant through the line 7 and softening it as described. If additional heat is required in the mud washer 14, a portion of the heated makeup water from the scrubber 6 may be flowed through the line 7b to the mud washer 14. If the dissolving water is partially made up of process water from the plant or from plant storage ponds it may contain a few percent of sodium carbonate already dissolved therein.

In contact with the trona muds the calcium hardness in the water is exchanged for sodium in the trona muds, the precipitated calcium carbonate is discharged from the system with the insoluble fraction of the muds and the water is softened to a hardness of about 56 p.p.m. calculated as $CaCO_3$. In this way softened water is provided in an inexpensive manner.

The clarified sodium carbonate solution from the settlers 11 flows through the line 12 to a wet scrubber 15 where it is contacted with hot gases from the dryer or calciner 19. In a plant producing 2,740 tons per day of soda ash this results in the evaporation of approximately 614 tons of water per day from the clarified feed solution going to the evaporators.

From the wet scrubber 15 the sodium carbonate solution flows through the line 12a to the evaporator station 16 where water is evaporated from the solution to produce about a 35% slurry of sodium carbonate containing crystals. In the particular embodiment illustrated in FIG. 1 the crystals produced are sodium carbonate monohydrate, if the evaporators are operated at atmospheric pressure or below, or anhydrous sodium carbonate if the evaporator station is operated at superatmospheric pressue and temperatures above 106° C. Any suitable evaporator system may be used in the evaporator station 16. The evaporators may be single effect evaporators, multiple effect vacuum evaporators, direct fired evaporators or the like.

From the evaporators 16 the crystal slurry containing about 35% by weight of crystals is flowed through the line 17 to a mixer or mixer station 18 where the crystal slurry is mixed with recycle soda ash from the calciner or dryer 19. In the mixer station 18, hot recycle soda ash at a temperature of about 160° C. is mixed with the crystal slurry in a ratio of about 3 to 6 parts recycle soda ash to 1 part crystal slurry. This absorbs most of the water in the crystal slurry, some of the recycle ash is rehydrated to sodium carbonate monohydrate and a substantially dry feed containing only about 3% free water is fed from the mixer 18 to the calciner dryer 19.

From the dryer calciner 19 the product stream of soda ash at a temperature of about 160° C. is fed through the line 21 to a cooler 22 where air is drawn through the hot soda ash to cool it to about 120° C. and from the cooler 22 the cooled soda ash flows through the line 22a to the storage or shipping station. Recycle ash flows through the line 21a to the mixer 18 to absorb water from the stream of crystal slurry. The ratio of recycle ash flowing through the line 21a to product ash flowing through the line 22a is about 6:1.

As the hot recycle ash is repeatedly brought into contact with crystal slurry containing about 65% by weight of sodium carbonate solution in the mixer 18 the particles of recycle ash have deposited thereon multiple layers of sodium carbonate, in an onion skin structure, so that this process produces a large amount of agglomerates of small crystals in the form of hard round pellets which grow in size by the deposit of a fresh layer on the surface each time the recycle ash passes through the mixer. These pellets are of distinctive appearance and have more desirable properties for shipment, glass making, solution and other uses than the normal fine crystalline soda ash produced by the ammonia soda and other soda ash processes.

The hot gases from the dryer calciner 19 flow through line 19a to a cyclone 23 where the sodium carbonate dust is separated from the gas stream and returned to the soda ash recycle line 21a while the hot gases at a temperature of about 165° C. flow through the line 23a to the wet scrubber 15 where any remaining soda ash is scrubbed out of the gas by the sodium carbonate stream 12 and the stream 12 is partially concentrated by evaporation of water therefrom.

Air drawn through the cooler 22, flows through the line 22b to a cyclone 24 where the sodium carbonate dust therein is separated and returned to the recycle ash stream 21a, and the heated air flows through the line 24a to the dryer calciner 19.

While I have illustrated a two stage calciner 4 for calcining the crude trona and a single stage calciner dryer 19 for drying or calcining the sodium carbonate crystals, it will be understood that any suitable calciner may be used for these respective operations and that the calciners 4 and 19 may be either single or multiple stage. Where high temperature calcining of the crude trona is used to remove organics found in the crude trona a two stage calciner is preferred.

The process described in connection with FIG. 1 can be used to produce either sodium carbonate monohydrate crystals or anhydrous soda ash in the evaporators 16, depending upon the pressure and temperature at which the evaporators are operated. Due to the inverse solubility of sodium carbonate monohydrate some crystals will be precipitated by heating the saturated crystallizer solution from the feed temperature of about 60° C. to the evaporation temperature of around 100° C. or above but more of the crystals will be precipitated by evaporation of water from the solution. Also due to the inverse solubility of sodium carbonate monohydrate there is no advantage in dissolving at a high temperature. The minimum temperature for dissolution is about 35° C., but as the decrease in solubility above 35° C. is small, the dissolving area of the plant may be allowed to operate at the natural temperature level produced by the hot calcined sodium carbonate in the dissolvers which is around 60° C., depending on the amount and temperature of the feed water.

In the process described no recycle mother liquor is produced, no expensive mother liquor recycle is necessary, and as the dissolving water is not already burdened with substantial amounts of dissolved sodium carbonate more of the calcined crude sodium carbonate can be dissolved in a given amount of water than in a mother liquor stream of equivalent volume having sodium carbonate already dissolved therein. Also as all the soluble constituents of the calcined trona go out of the system with the finished product there is no build up of impurities and no expensive discard of sodium carbonate containing solutions.

In the embodiment of the invention illustrated in FIG. 2 crushed crude trona from a mine or other source, preferably crushed to —20 mesh is introduced into the dissolver 30 where it is dissolved, preferably in softened dissolver water heated in heater 31 to about 100° C. From the dissolver 30 the dissolver solution together with the insolubles is introduced into a steam stripping tower 32 in which steam from the line 33 is forced through the trona solution to strip $CO_2$ from the bicarbonate fraction of the trona solution to convert the trona solution to a sodium carbonate solution according to the equation

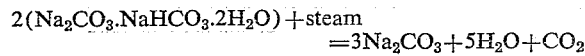

This type of steam stripping is sometimes referred to as "wet calcining" and can be used to convert the trona solution to a sodium carbonate solution containing about 85 to 87% of the sodium in the solution as $Na_2CO_3$ with about the same efficiency as the calcining operation illustrated at 4 in FIG. 1. If desired, the dissolving and stripping operation may be carried out in the same vessel. Whether the dissolving and stripping are carried out separately or together the additional agitation and heat supplied by the steam from line 33 dissolves further amounts of trona from the trona muds discharged from the dissolver 30. The steam passing out of the stripper 32 is passed through line 34 to heater 31 to heat the water going into the dissolver 30 or the dissolver stripper 32. The solution flowing out of the stripper 32, with the insolubles therein, flows through the line 36 to the clarifiers 37 where the insoluble muds settle out of the solution and are removed from the bottom of the clarifiers 37 through the line 38 while the clarified overflow solution flows through the line 39 for processing into soda ash in a manner similar to that described in connection with FIG. 1.

The muds from the line 38 are flowed into a mud washer 40 where they are washed with incoming water from the line 41 to soften the dissolver water as described in connection with FIG. 1 and to recover any hitherto undissolved soda values in the trona muds. From the mud washers 40 the now softened makeup water flows through the line 41a and heater 31 to the dissolver 30.

The clear sodium carbonate solution from the clarifiers 37 flows through the line 39 to a wet scrubber 42 where it is contacted with hot gases from the drier or calciner 46. This results in the evaporation of water from the clarified feed solution going to the evaporators and in the partial concentration of the evaporator feed solution.

From the wet scrubber 42 the sodium carbonate solution flows through the line 39a to the evaporator station 43 where water is evaporated from the solution to produce a slurry of sodium carbonate containing about 35% by weight of crystals. In the evaporators 43 most of the $NaHCO_3$ remaining in the solution will be decomposed so that in the particular embodiment described in connection with FIG. 2 the crystals produced are mostly sodium carbonate monohydrate if the evaporators are operated at atmospheric pressure or below, or mostly anhydrous sodium carbonate if the evaporator station is operated at superatmospheric pressure and temperatures above 106° C. Any small amount of $NaHCO_3$ in the slurry does not interfere with the production of satisfactory soda ash. Any suitable evaporator system may be used in the evaporator station 43. The evaporators may be single effect evaporators, multiple effect vacuum evaporators, direct fired evaporators or the like.

From the evaporators 43 the crystal slurry containing about 35% by weight of crystals is flowed through the line 44 to a mixer or mixer station 45 where the crystal slurry is mixed with recycle soda ash from the calciner or dryer 46. In the mixer station 45, hot recycle soda ash at a temperature of about 160° C. is mixed with the crystal slurry in a ratio of about 3 to 6 parts recycle soda ash to 1 part crystal slurry. This absorbs most of the water in the crystal slurry, some of the recycle ash is rehydrated to sodium carbonate monohydrate and a substantially dry feed containing only about 3% free water is fed from the mixer 45 to the calciner dryer 46.

From the dryer calciner 46 the product stream of soda ash at a temperature of about 160° C. is fed through the line 48 to a cooler 49 where air is drawn through the hot soda ash to cool it to about 120° C. and from the cooler 49 the cooled soda ash flows through the line 50 to the storage or shipping station. Recycle ash flows through the line 48a to the mixer 45 to absorb water from the stream of crystal slurry.

In this embodiment also the hot recycle ash is repeatedly brought into contact with crystal slurry containing about 65% by weight of sodium carbonate solution in the mixer 45 and the particles of recycle ash have deposited thereon multiple layers of sodium carbonate, in an onion skin effect, so that this process produces a large amount of agglomerates of small crystals in the form of hard round pellets which grow in size by the deposit of a fresh layer on the surface each time the recycle ash passes through the mixer 45. These pellets are of distinctive appearance and have more desirable properties for shipment, glass making, solution and other uses than the normal fine crystalline soda ash produced by the ammonia soda and other soda ash processes.

The hot gases from the dryer calciner 46 flow through line 46a to a cyclone 51 where the sodium carbonate dust is separated from the gas stream and returned to the soda ash recycle line 48a while the hot gases at a temperature of about 165° C. flow through the line 51a to the wet scrubber 42 where any remaining soda ash is scrubbed out of the gas by the sodium carbonate stream 39 and the stream 39 is partially concentrated by evaporation of water therefrom.

The air drawn through the cooler 49 flows through the line 49a to a cyclone 52 where the sodium carbonate dust therein is separated and returned to the recycle ash stream 48a, and the heated air flows through the line 52a to the dryer calciner 46.

In the process described in connection with FIG. 2, as is also true in the embodiment of FIG. 1, no recycle mother liquor is produced, no expensive mother liquor recycle is necessary, and as the dissolving water is not already burdened with dissolved sodium carbonate more of the crude trona can be dissolved in a given amount of water than in an equivalent mother liquor stream. Also as all the soluble constituents of the trona go out of the system with the finished product there is no build up of impurities and no expensive discard of carbonate containing solutions. The minimum temperature for dissolution, however, according to the embodiment of FIG. 2 is about 95 to 98° C.

If desired, concentrating crystal feeders may be provided between the evaporator stations 16 or 42 and the mixers 18 or 45. The use of concentrating crystal feeders insures the delivery of a slurry containing at least 35% crystals to the mixers 18 or 45 and protects the process against occasional slugs of lower concentration slurry which would tend to disturb the operation of the dryer calciners 19 or 46. If concentrating crystal feeders are used, the overflow liquor from the concentrating feeders may be returned to the evaporator feed lines 12a or 39a without materially altering the composition of the feed streams to the evaporator stations 16 or 43.

In place of a trona solution produced by dissolving crushed crude trona in dissolver 30, solution mined trona produced from single or multiple interconnected weels, as described, for example, in U.S. Patent No.

2,979,317 may be introduced into stripper 32 and the process otherwise operated substantially as described in connection with FIG. 2. Solution mined trona is produced by flowing water or other trona solvent through wells penetrating into the trona formation. The wells may be single wells or multiple interconnected wells, connected by hydraulically fracturing the trona formation or by otherwise interconnecting the wells. Solution mining may also be used to recover trona from abandoned trona mines. Normally the insolubles settle out of the trona solution underground, so that no settling of the trona solution from a solution mining operation is necessary. Also the dissolving water is softened by contact with the underground trona formation and no prior softening of the solution mining liquor is necessary.

Instead of converting the trona solution into a sodium carbonate solution in stripper 32 the trona solution may be passed directly into clarifiers 37 and the settler overflow passed through the line 39 for processing into soda ash as described. In this type of process a mixture of sodium sesquicarbonate and anhydrous sodium carbonate or sodium sesquicarbonate and sodium carbonate monohydrate may be produced in evaporators 43. This mixture containing about 35% of crystals can still be mixed with recycle soda ash in mixer 45 to absorb the liquor in the solution and produce a substantially dry feed to the calciner dryers 46. As most of the recycle soda ash will be converted into sodium carbonate monohydrate in the mixer 45 the mixture of crystals can be calcined into soda ash in calciner 46 without too great detriment to the quality of soda ash produced.

*Example I*

For a plant producing 2740 tons per day (T/D) of soda ash according to the embodiment of the invention illustrated and described in connection with FIG. 1 the following conditions are maintained:

| | |
|---|---|
| Tons of crude trona per day to crushers | 4230 T/D. |
| 7% insolubles | 297 T/D. |
| Water—1083 gallons per minute | 6514 T/D. |
| Natural gas to calciner 4 | 4.04 MMSCFD. |
| Settler overflow (31% solution) | 2740 T/D $Na_2CO_3$, 6114 T/D $H_2O$, 1115 GPM. |
| Sludge to waste | 297 T/D insolubles, 400 T/D wash solution. |
| $H_2O$ evaporated in scrubber 15 | 614 T/D. |
| Solution to evaporators 16 (31% solution) | 7880 T/D, 350 T/D $Na_2CO_3 \cdot H_2O$. |
| Solution from evaporators (35% crystals) | 3555 T/D, 1915 T/D $Na_2CO_3 \cdot H_2O$. |
| Recycle soda ash | 16,100 T/D. |
| Product stream 22a | 2740 T/D $Na_2CO_3$. |

*Example II*

According to the embodiment of the invention illustrated and described in connection with FIG. 2 the stripping tower 32 is operated to provide a feed stream 39 of the approximate composition—$NaHCO_3$ 5.9%, $Na_2CO_3$ 23.8%, $H_2O$ 70.3%, which has a total soda ash content of 27.52%. This requires that the stripper 32 be operated to produce a feed stream composition in which about 86.5% of the sodium in the feed liquor is in the form of $Na_2CO_3$ and the remainder of the sodium in the form of $NaHCO_3$. For a plant producing 2740 tons per day of soda ash from a feed liquor of this composition the following conditions are maintained:

| | T/D |
|---|---|
| Tons of crude trona per day to crushers | 4230 |
| 7% insolubles | 297 |
| Water—1057 gallons per minute | 6340 |
| Steam to stripper column | 1414 |
| Settler overflow solution: | |
| $NaHCO_3$ | 587 |
| $Na_2CO_3$ | 2370 |
| $H_2O$ | 9693 |
| 1285 gallons/min., total | 9950 |
| Sludge to waste: | |
| Insolubles | 297 |
| Wash solution | 400 |
| Water evaporated in scrubber (42) | 456 |
| Solution from evaporators (35% crystals) $Na_2CO_3 \cdot H_2O$ | 3555, 1915 |
| Recycle soda ash | 16,100 |
| Product stream (50) $Na_2CO_3$ | 2740 |

The term "water" as used in the claims hereof is intended to include the natural water of the region or water from plant storage ponds which may contain a few percent of sodium carbonate already dissolved therein.

Various other modifications and changes can be made in the process described without departing from the spirit of my invention or the scope of the following claims.

I claim:
1. The method of producing refined soda ash from crude trona which comprises dissolving the soluble constituent of materials from the group consisting of crude trona and calcined crude trona to form a solution thereof, separating the insoluble material from said solution, evaporating the solution to produce sodium carbonate containing crystals therein, mixing a slurry of said crystals and said solution with hot soda ash to substantially absorb said solution and calcining the mixture thus produced to soda ash.

2. The method of producing refined soda ash from crude trona which comprises dissolving the soluble constituent of materials from the group consisting of crude trona and calcined crude trona to form a solution thereof, separating the insoluble material from said solution, evaporating the solution to produce sodium carbonate containing crystals therein, mixing a slurry of said crystals and said solution with hot soda ash to substantially absorb said solution, calcining the mixture thus produced to soda ash and recycling a portion of the soda ash so produced to absorb more of said solution.

3. The method of producing refined soda ash from crude trona which comprises dissolving the soluble constituent of materials from the group consisting of crude trona and calcined crude trona in water to form a solution thereof, separating the insoluble material from said solution, evaporating the solution to produce sodium carbonate containing crystals therein, mixing a slurry of said crystals and said solution with hot soda ash to substantially absorb the water in said solution, calcining the mixture thus produced to soda ash and recycling a portion of the soda ash so produced to absorb more of said solution.

4. The method of producing refined soda ash from crude trona which comprises dissolving material from the group consisting of crude trona and calcined crude trona to form a solution thereof, separating insoluble material from said solution, evaporating said solution to produce sodium carbonate containing crystals therein, mixing the slurry of said crystals and said solution with approximately a three to six-fold amount of hot soda ash to substantially absorb said solution, drying and calcining the mixture so produced to soda ash and recirculating a portion of said soda to absorb more of said slurry.

5. The method of producing refined soda ash from crude trona which comprises dissolving material from the group consisting of crude trona and calcined crude trona in softened water to form a solution thereof, separating insoluble material from said solution, evaporating said solution to produce sodium carbonate containing crystals therein, mixing the slurry of said crystals and said solution with approximately a three to six-fold amount of hot soda ash to substantially absorb the water in said solution, drying and calcining the mixture so produced to soda ash and recirculating a portion of said soda to absorb more of said slurry.

6. The method of producing refined soda ash from crude trona which comprises dissolving material from the group consisting of crude trona and calcined crude trona in softened water to form a solution thereof, separating insoluble material from said solution, evaporating said solution to produce sodium carbonate containing crystals from the group consisting of sodium carbonate monohydrate, anhydrous sodium carbonate, sodium sesquicarbonate and sodium bicarbonate therein, mixing the slurry of said crystals and said solution with approximately a three-fold amount of hot soda ash to substantially absorb the water in said solution and substantially convert the hot soda ash to sodium carbonate monohydrate, drying and calcining the mixture so produced to soda ash and recirculating a portion of said soda ash to absorb more of said slurry.

7. The method of producing refined soda ash from crude trona which comprises calcining the crude trona, dissolving the soluble constituent of materials from the calcined crude trona to form a solution thereof, separating the insoluble material from said solution, evaporating the solution to produce anhydrous sodium bicarbonate crystals therein, mixing a slurry of said crystals and said solution with hot soda ash to substantially absorb said solution and calcining the mixture thus produced to soda ash.

8. The method of producing refined soda ash from crude trona which comprises dissolving the soluble constituent of crude trona in water to form a solution thereof, steam stripping the said solution to convert the sodium bicarbonate fraction of the trona to sodium carbonate, separating the insoluble material from said solution, evaporating the solution to produce anhydrous sodium carbonate crystals therein, mixing a slurry of said crystals and said solution with hot soda ash to substantially absorb said solution and calcining the mixture thus produced to soda ash.

9. The method of producing refined soda ash from crude trona which comprises dissolving and steam stripping crude trona in water to form a solution of sodium carbonate, separating the insoluble material from said solution, evaporating the solution to produce anhydrous sodium carbonate crystals therein, mixing a slurry of said crystals and said solution with hot soda ash to substantially absorb said solution and calcining the mixture thus produced to soda ash and recycling the major portion of said soda ash to absorb more of said slurry.

10. The method of producing refined soda ash from crude trona which comprises dissolving the soluble constituent of crude trona in water to form a solution thereof, separating the insoluble material from said solution, evaporating the solution to produce sodium carbonate containing crystals from the group consisting of sodium sesquicarbonate, an anhydrous sodium carbonate, sodium carbonate monohydrate and sodium bicarbonate therein, mixing a slurry of said crystals and said solution with hot soda ash to substantially absorb the water in said solution and convert the soda ash to sodium carbonate monohydrate, calcining the mixture thus produced to soda ash and recycling a portion of the soda ash so produced to absorb more of said solution.

11. The method of producing soda ash from crude trona which comprises forming a solution of materials from the group consisting of crude trona and calcined crude trona, forming a slurry of sodium carbonate containing crystals from said solution containing about 35% of crystals, adding said slurry to a recycling stream of hot soda ash to absorb the water in said slurry and produce a substantially dry mixture, calcining said mixture to soda ash and recycling a major portion of said soda ash to absorb more of said slurry.

12. The method of producing soda ash which comprises adding a slurry of sodium carbonate containing crystals containing about 35% of crystals to a recycling stream of hot soda ash to absorb the water in said slurry and produce a substantially dry mixture, calcining said mixture to soda ash and recycling a major portion of said soda ash to absorb more of said slurry.

13. The method of producing refined soda ash from crude trona which comprises calcining the crude trona, dissolving the soluble constituent of materials from the calcined crude trona to form a solution thereof, separating the insoluble material from said solution, evaporating the solution to produce sodium carbonate monohydrate crystals therein, mixing a slurry of said crystals and said solution with hot soda ash to substantially absorb said solution and calcining the mixture thus produced to soda ash.

14. The method of producing refined soda ash from crude trona which comprises dissolving the soluble constituent of crude trona in water to form a solution thereof, steam stripping the said solution to convert the sodium bicarbonate fraction of the trona to sodium carbonate, separating the insoluble material from said solution, evaporating the solution to produce sodium carbonate monohydrate crystals therein, mixing a slurry of said crystals and said solution with hot soda ash to substantially absorb said solution and calcining the mixture thus produced to soda ash.

15. The method of producing refined soda ash from crude trona which comprises dissolving and steam stripping crude trona in water to form a solution of sodium carbonate, separating the insoluble material from said solution, evaporating the solution to produce sodium carbonate monohydrate crystals therein, mixing a slurry of said crystals and said solution with hot soda ash to substantially absorb said solution and calcining the mixture thus produced to soda ash and recycling the major portion of said soda ash to absorb more of said slurry.

References Cited by the Examiner

UNITED STATES PATENTS

| | | | |
|---|---|---|---|
| 1,473,259 | 11/23 | Sundstrum et al. | 23—63 |
| 1,994,892 | 3/35 | MacMullin et al. | 23—63 |
| 2,267,136 | 12/41 | Robertson | 23—63 |
| 2,780,520 | 2/57 | Pike | 23—63 |
| 2,962,348 | 11/60 | Seglin et al. | 23—63 X |
| 2,970,037 | 1/61 | Caldwell et al. | 23—63 |

MAURICE A. BRINDISI, *Primary Examiner.*

GEORGE D. MITCHELL, *Examiner.*

UNITED STATES PATENT OFFICE
CERTIFICATE OF CORRECTION

Patent No. 3,189,408  June 15, 1965

Warren Standish Miller

It is hereby certified that error appears in the above numbered patent requiring correction and that the said Letters Patent should read as corrected below.

Column 2, line 36, after "FIG. 1" insert -- is --; column 4, line 65, for "abve" read -- above --; column 6, line 75, for "weels" read -- wells --; column 8, line 9, for "9693" read -- 6993 --.

Signed and sealed this 27th day of September 1966.

(SEAL)
Attest:

ERNEST W. SWIDER
Attesting Officer

EDWARD J. BRENNER
Commissioner of Patents